US009173136B2

(12) United States Patent
Macalet et al.

(10) Patent No.: US 9,173,136 B2
(45) Date of Patent: Oct. 27, 2015

(54) METHODS, SYSTEMS, AND COMPUTER READABLE MEDIA FOR PERFORMING SINGLE RADIO VOICE CALL CONTINUITY (SRVCC) HANDOVERS

(71) Applicant: Ixia, Calabasas, CA (US)

(72) Inventors: Catalina Macalet, Bucharest (RO); Anda Maria Nicolae, Bucharest (RO); Andrei Slavoiu, Suceava (RO)

(73) Assignee: IXIA, Calabasas, CA (US)

( * ) Notice: Subject to any disclaimer, the term of this patent is extended or adjusted under 35 U.S.C. 154(b) by 131 days.

(21) Appl. No.: 13/894,426

(22) Filed: May 14, 2013

(65) Prior Publication Data

US 2014/0334441 A1 Nov. 13, 2014

(30) Foreign Application Priority Data

May 13, 2013 (RO) ........................ 13-0353

(51) Int. Cl.
*H04W 36/18* (2009.01)
*H04W 36/00* (2009.01)
*H04W 24/06* (2009.01)

(52) U.S. Cl.
CPC .......... *H04W 36/0022* (2013.01); *H04W 24/06* (2013.01)

(58) Field of Classification Search
CPC ............ H04W 36/0022; H04W 36/00; H04W 36/0005; H04W 80/10; H04W 36/12; H04W 24/00; H04W 36/0033; H04W 76/00; H04B 17/00; H04B 10/08; H04L 43/12; H04L 43/50; H04L 12/28
USPC .................................................. 370/241, 331
See application file for complete search history.

(56) References Cited

U.S. PATENT DOCUMENTS

| 2005/0085265 | A1* | 4/2005 | Laroia et al. ................. 455/560 |
| 2007/0189255 | A1* | 8/2007 | Navali et al. ................. 370/338 |
| 2008/0049623 | A1* | 2/2008 | Qiu et al. ..................... 370/241 |
| 2008/0267199 | A1* | 10/2008 | Smith et al. .................. 370/401 |
| 2009/0209250 | A1* | 8/2009 | Huq .............................. 455/425 |
| 2009/0264131 | A1* | 10/2009 | Wu et al. ...................... 455/436 |
| 2009/0290556 | A1* | 11/2009 | Taaghol ........................ 370/331 |

(Continued)

OTHER PUBLICATIONS

ETSI, "Digital cellular telecommunications system (Phase 2+), Universal Mobile Telecommunications System (UMTS), LTE, Single Radio Voice Call Continuity (SRVCC), Stage 2, (3GPP TS 21.216 version 10.10 Release 10)", Jun. 2011, ETSI, ETSI TS 123 216 V10.1.0.*

(Continued)

*Primary Examiner* — Gary Mui
*Assistant Examiner* — Michael Phillips
(74) *Attorney, Agent, or Firm* — Jenkins, Wilson, Taylor & Hunt, P.A.

(57) ABSTRACT

Methods, systems, and computer readable media for performing single radio voice call continuity (SRVCC) handover are disclosed. According to one method, the method occurs at a testing platform. The method includes receiving, via a communications channel for exchanging messages between a first session initiation protocol (SIP) peer and a second SIP peer, a first message for triggering a bearer deletion procedure associated with a call between the first SIP peer and the second SIP peer. The method also includes in response to receiving the first message or a related message, triggering the bearer deletion procedure prior to changing an access technology.

21 Claims, 5 Drawing Sheets

(56) References Cited

U.S. PATENT DOCUMENTS

| | | | |
|---|---|---|---|
| 2009/0310561 A1* | 12/2009 | Grob et al. | 370/331 |
| 2010/0075678 A1* | 3/2010 | Akman et al. | 455/436 |
| 2010/0080197 A1* | 4/2010 | Kanellakis et al. | 370/338 |
| 2010/0227621 A1* | 9/2010 | Wu | 455/450 |
| 2012/0287844 A1* | 11/2012 | Ophir et al. | 370/315 |
| 2012/0294275 A1* | 11/2012 | Krishnaswamy et al. | 370/331 |
| 2013/0010752 A1* | 1/2013 | Rydnell et al. | 370/331 |
| 2013/0034230 A1* | 2/2013 | Takahashi | 380/270 |
| 2013/0083773 A1* | 4/2013 | Watfa et al. | 370/331 |
| 2013/0294407 A1* | 11/2013 | Mutikainen et al. | 370/331 |
| 2014/0092866 A1* | 4/2014 | Teyeb et al. | 370/331 |
| 2014/0155019 A1* | 6/2014 | Schwartz et al. | 455/404.1 |

OTHER PUBLICATIONS

Qualcomm, "VoLTE with SRVCC: The Second Phase of Voice Evolution for LTE Devices," White Paper, pp. 1-10 (Oct. 2012).

* cited by examiner

METHODS, SYSTEMS, AND COMPUTER READABLE MEDIA FOR PERFORMING SINGLE RADIO VOICE CALL CONTINUITY (SRVCC) HANDOVERS

PRIORITY CLAIM

This application claims the benefit of Romanian Patent Application No. A2013-00353, filed May 13, 2013; the disclosure of which is incorporated herein by reference in its entirety.

TECHNICAL FIELD

The subject matter described herein relates to performing handover procedures. More specifically, the subject matter relates to methods, systems, and computer readable media for performing single radio voice call continuity (SRVCC) handovers.

BACKGROUND

In communications networks, such as LTE or LTE-advanced networks, network components are often tested using devices that generate test packets, send the packets to a device under test, receive responsive packets from the device under test, and generate statistics indicative of the performance of the device under test. For example, in LTE networks, it may be desirable to test the functionality of a serving gateway (SGW), an evolved node b (eNB), or other network nodes by sending streams of test packets to them. In another example, streams of test packets may mimic the traffic that would be received by such a node if the node were operating in a live network. In other tests, the goal is to send streams of packets that test the extremes of the operational capabilities or stress test the device under test.

In some test environments, handover events and related handover procedures may be tested. For example, one or more network nodes may be emulated by a testing platform or other test equipment. User devices or user equipment (UEs) may also be emulated. When testing handover events, the testing platform may emulate a user device moving outside a coverage area. The testing platform may then perform handover-related actions (e.g., emulate messages and/or various procedures) for connecting to additional and/or different network nodes.

Various problems can arise when testing handover events using a testing platform. One problem that may occur is dropped calls or packets. For example, if a handover procedure is not performed correctly, some packets may be sent to nodes no longer in the call's bearer path and may be lost or not be received by an intended recipient.

Accordingly, in light of these difficulties, a need exists for methods, systems, and computer readable media for performing single radio voice call continuity (SRVCC) handovers.

SUMMARY

Methods, systems, and computer readable media for performing single radio voice call continuity (SRVCC) handover are disclosed. According to one method, the method occurs at a testing platform. The method includes receiving, via a communications channel for exchanging messages between a first session initiation protocol (SIP) peer and a second SIP peer, a first message for triggering a bearer deletion procedure associated with a call between the first SIP peer and the second SIP peer. The method also includes in response to receiving the first message or a related message, triggering the bearer deletion procedure prior to changing an access technology.

According to one system, the system includes a testing platform. The testing platform includes a communications interface configured to receive a message for triggering deletion of a bearer path between a first SIP peer and a second SIP peer. The testing platform also includes a network node emulated using at least one processor. The network node is configured to, in response to receiving the first message or a related message, trigger the bearer deletion procedure prior to changing an access technology.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for performing single radio voice call continuity (SRVCC) handovers. When testing networks and/or network equipment, it may be desirable to test the response of the network, network nodes, and/or other equipment during a handover event.

In accordance with some aspects of the subject matter disclosed herein, a testing platform may be configured to perform aspects associated with an SRVCC handover, so that at least some events associated with the handover occur in the same order as an SRVCC handover occurring in a live or real-world environment. In some embodiments, events may be triggered or facilitated using a communications channel between session initiation protocol (SIP) peers that may be transparent to end-users. For example, a call between a first SIP peer and a second SIP peer may be emulated using a signaling path and a bearer path associated with various emulated network nodes. The SIP peers may also communicate via an inter-peer communications channel (e.g., a management channel or a backplane channel of a testing platform that is different from a call signaling path and from a call bearer path). In this example, a first SIP peer may notify, using the inter-peer communications channel, a second SIP peer that a handover event condition has occurred. The second SIP peer may receive the notification and trigger a serving gateway to initiate a bearer deletion procedure in response to this notification. By using the inter-peer communications channel, a serving gateway (SGW) may be notified about a handover event condition and may initiate a bearer deletion procedure without receiving any messages from network nodes (such as an mobility management entity (MME) via the signaling path or the bearer path).

Accordingly, a testing platform in accordance with some aspects of the subject matter disclosed herein may emulate an SRVCC handover substantially similar to an SRVCC handover in a real-life or live network by sending messages between SIP peers that triggers events via a communications channel. For example, a testing platform may transparently trigger 3GPP procedures at a server (e.g., a first port module) when an event happens at a client (e.g., a second port module) by using a communication channel.

Further, a testing platform in accordance with some aspects of the subject matter disclosed herein may perform an SVRCC and/or an inter-radio access technology (I-RAT) handover without losing packets by using the inter-peer communications channel to synchronize when SIP peers stop packet transmission and packet reception for a call along a given bearer path.

Figure 1:
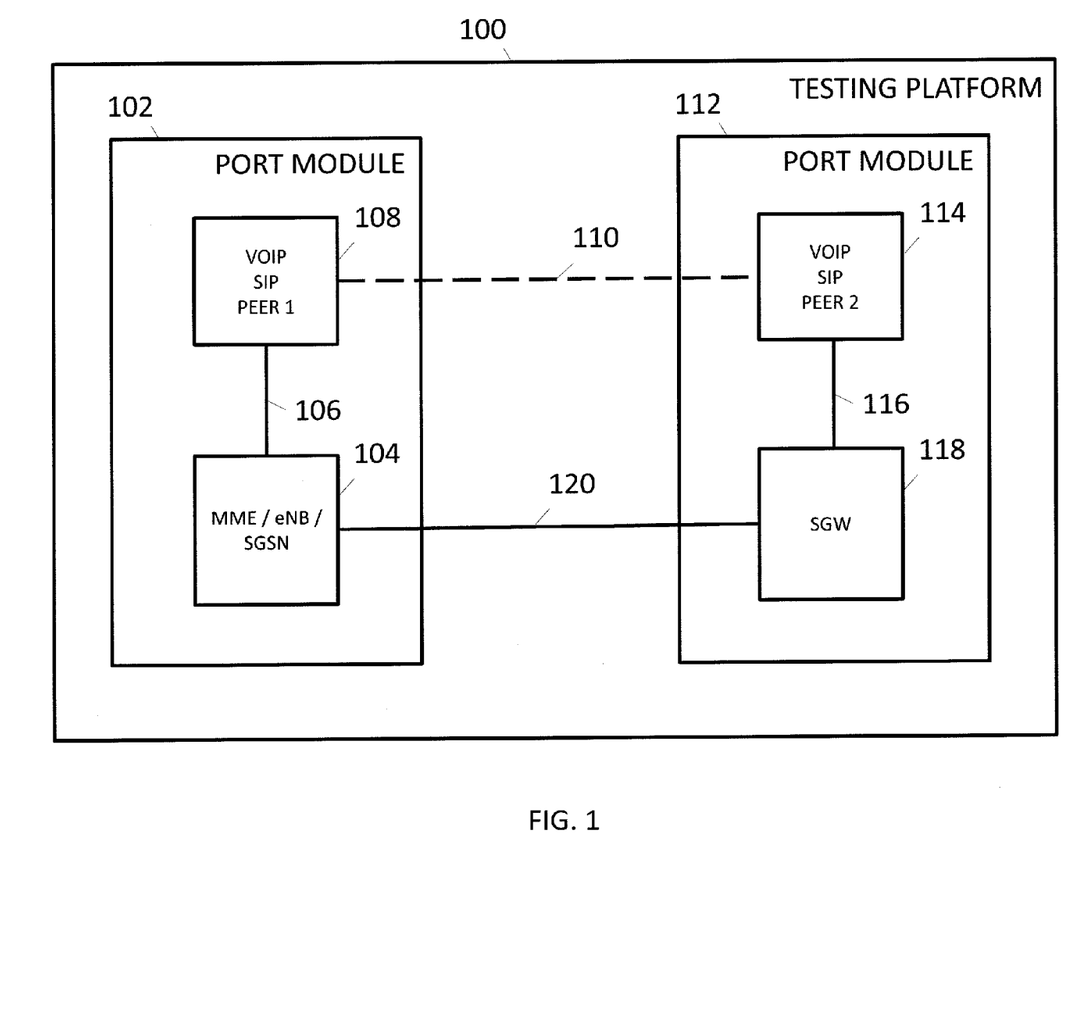
FIG. 1 is a diagram illustrating an exemplary testing platform for performing an SRVCC handover according to an embodiment of the subject matter described herein.

FIG. 1 is a diagram illustrating an exemplary testing platform 100 for performing an SRVCC handover according to an embodiment of the subject matter described herein. Testing platform 100 may be any suitable entity (e.g., a stand-alone node or distributed multi-node system) configured to perform one or more aspects associated with testing a network, a system under test (SUT), a device under test (DUT), or components of testing platform. In some embodiments, testing platform 100 may be a stand-alone tool, a testing device, or software executing on a processor. In some embodiments, testing platform 100 may be a single node or may be distributed across multiple computing platforms or nodes.

In the embodiment illustrated in FIG. 1, testing platform 100 may be configured for back to back testing. For example, testing platform 100 may perform actions and/or services associated with testing various components, modules, or portions in testing platform 100. In this example, testing platform 100 may not be associated with testing an external DUT or SUT.

In some embodiments, testing platform 100 may be integrated or co-located with a multiple UE simulator (multi-UE simulator). The multi-UE simulator may include functionality for simulating or emulating one or more 3GPP (e.g., LTE or LTE-advanced) or other UEs, sending communications, receiving communications, and/or testing communications capabilities of various nodes or components. For example, testing platform 100 may be configured to generate control plane commands that trigger establishment of one or more tunnels for numerous simulated UEs to communicate with a packet data network, such as the Internet.

In some embodiments, testing platform 100 may simulate or emulate one or more evolved packet core (EPC) nodes. For example, testing platform 100 may emulate a node b or evolved node b (eNB). An eNB may represent any suitable entity (e.g., a base transceiver station (BTS), node B, eNode B, a WiMAX base station etc.) for providing LTE or LTE advanced data via an air or wire interface. For example, an eNB may include functionality similar to that of a radio network controller (RNC) and a base station (BS) in 2G networks or an RNC and a Node B in 3G mobile networks. In some embodiments, eNB 102 may communicate directly with UEs and may be responsible for header compression, ciphering, reliable delivery of packets, admission control, and radio resource management. An eNB may also communicate with various other modules and/or nodes.

Testing platform 100 may include one or more port modules, such as port modules 102 and 112. Port modules 102 and 112 may be any suitable entity (e.g., an ASIC, a FPGA, or software executing on a processor) for receiving data, transmitting data, and/or processing data. For example, port module 102 may comprise an Xcellon-Ultra™ card manufactured by IXIA® or a portion therein (e.g., a physical port with a dedicated processor and memory) and may be configured to simulate or emulate packets associated with various nodes or UEs. In this example, port module 112 may comprise a different portion (e.g., a separate physical port and associated resources) of the Xcellon-Ultra™ card or may be associated with a different Xcellon-Ultra™ card.

In some embodiments, port modules 102 and 112 may each include at least one processor, memory, and/or one or more network interface cards (NICs). The NICs may receive data from or transmit data to a DUT or another port module via one or more physical ports, communications interfaces, or connections. In some embodiments, port modules 102 and 112 may include functionality for communicating using a common public radio interface (CPRI) protocol or other protocols. For example, a CPRI interface and/or link may provide data from a radio head to port modules 102 and 112 and vice versa.

Port modules 102 may include an emulated MME, an eNB, and/or a serving general packet radio service (GPRS) support node (SGSN), referred to herein as MME/eNB/SGSN 104, a loopback or internal communications channel 106, and a voice over Internet protocol (VoIP) SIP peer 108. MME/eNB/SGSN 104 may represent any suitable entity (e.g., software executing on a processor in port module 102) for performing one or more functions associated with an eNB, MME, and/or an SGSN. For example, MME/eNB/SGSN 104 may emulate an MME and may manage mobility events in a 4G (e.g., an LTE, LTE-advanced, or evolved packet core (EPC)) network associated with a user device or an emulated user device. In another example, MME/eNB/SGSN 104 may emulate an SGSN and may manage mobility events in a 3G (e.g., an IMS) network associated with a user device or an emulated user device and/or may deliver packets to mobile stations. In yet another example, MME/eNB/SGSN 104 may emulate an eNB and may communicate directly with a UE or a VoIP SIP peer. MME/eNB/SGSN 104 may inform other nodes, emulated nodes, or components of testing platform 100 that a mobility event or a related handover event is starting, occurring, or stopping.

Internal communications channel 106 may represent any suitable entity (e.g., a loopback channel or interface) for facilitating communications between components or portions of port module 102. For example, internal interface 106 may be a physical channel, a circuit path, or a communications bus that allows messages or information to be communicated between portions of port module 102.

VoIP SIP peer 108 may represent any suitable entity for simulating or emulating a VoIP and/or SIP user agent, such as a SIP client or SIP server and/or a SIP endpoint. For example, VoIP SIP peer 108 may be a softphone (e.g., software executing on a processor in port module 102 that performs one or more telephony functions).

Port modules 112 may include a VoIP SIP peer 114, a loopback or internal communications channel 116, and an emulated serving gateway (SGW) 118. VoIP SIP peer 114 may represent any suitable entity for simulating or emulating a VoIP and/or SIP user agent, such as a SIP client or SIP server and/or a SIP endpoint. For example, VoIP SIP peer 114 may be software executing on a processor in port module 112 that performs one or more telephony functions.

Internal communications channel 116 may represent any suitable entity (e.g., a loopback channel or interface) for facilitating communications between components or portions of port module 112. For example, internal interface 116 may be a physical channel, a circuit path, or a communications bus that allows messages or information to be communicated between portions of port module 112.

SGW 118 may represent any suitable entity (e.g., software executing on a processor in port module 112) for performing one or more functions associated with an SGW. SGW 118 may act as a mobility anchor between an LTE network and non-4G (e.g., 3G) networks and may route and forward user data packets. For example, SGW 118 may facilitate communications (e.g., real-time transport protocol (RTP) packets) between VoIP SIP peer 114 and VoIP SIP peer 108.

In some embodiments, testing platform 100 may include a communications bus, interfaces, circuit board paths, inter-component (e.g., inter-peer), or intra-platform channels for exchanging messages and/or information among various components or modules in testing platform 100. For example, intra-platform channels, such as communications channels 110 and 120, may use a backplane and associated backplane interfaces.

Communications channel 110 may represent an inter-peer (e.g., intra- or inter-platform) channel between port module 102 and port module 112. Communications channel 110 may facilitate communications between VoIP SIP peer 108 and VoIP SIP peer 114. For example, a mobility start notification may be sent from VoIP SIP peer 108 to VOIP SIP peer 114 via communications channel 110. In some embodiments, communications channel 110 may be transparent or invisible to one or more end-users. For example, an end-user may be unaware of messages traversing communications channel 110, but aware of messages traversing communications channel 120.

In some embodiments, communications channel 110 may be a "lossless" communications channel. For example, communications channel 110 may be used to prevent RTP packets from being lost during a handover event by synchronizing one or more procedures at VoIP SIP peer 108 and VOIP SIP peer 114. In another example, communications channel 110 may be associated with a high reliability for transmission and reception of messages.

In some embodiments, communications channel 110 may be a management channel or a backplane channel and may be different from a call signaling path associated with a call between VoIP SIP peer 108 and VOIP SIP peer 114 and/or may be different from a call bearer path associated with a call between VoIP SIP peer 108 and VOIP SIP peer 114.

Communications channel 120 may represent another communication channel between port module 102 and port module 112. Communications channel 120 may facilitate communications between VoIP SIP peer 108 and VOIP SIP peer 114 and/or communications between emulated network nodes, such as MME/eNB/SGSN 104 and SGW 118, or other nodes (e.g., a DUT or SUT). For example, a call signaling control message (e.g., a create bearer path request or a create bearer path response) may be sent between MME/eNB/SGSN 104 and SGW 118 via communications channel 120. In another example, VoIP packets may be exchanged between VoIP SIP peer 108 and VOIP SIP peer 114 by traversing MME/eNB/SGSN 104 and/or SGW 118 using communications channel 120.

In some embodiments, communications channel 120 may be referred to as the wire and message exchanged via communications channel 120 may be visible to one or more end-users or external probes or network nodes. In some embodiments, communications channel 120 may be part of a call signaling path or a call bearer path between VoIP SIP peer 108 and VOIP SIP peer 114.

It will also be appreciated that the above described modules, components, and nodes are for illustrative purposes and that features or portions of features described herein may be performed by different and/or additional modules, components, or nodes. It will also be appreciated that some modules and/or components may be combined and/or integrated.

Figure 2:
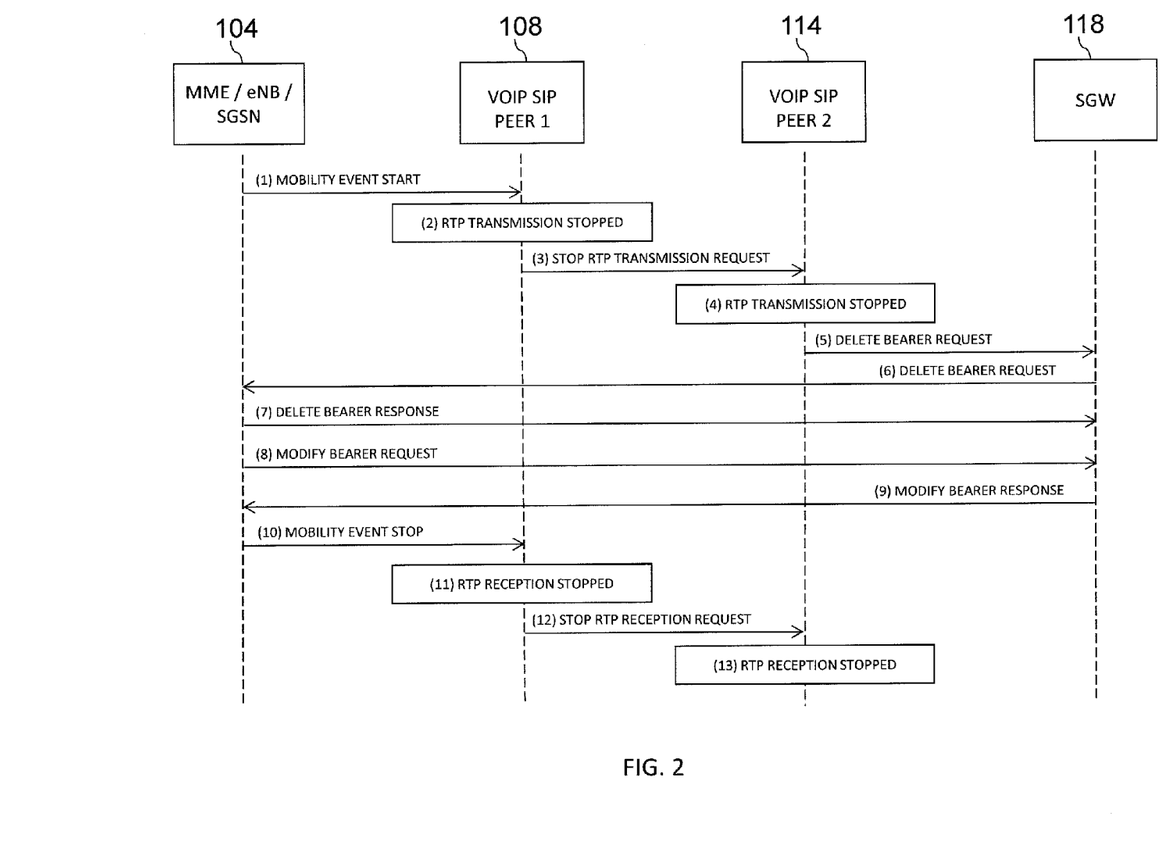
FIG. 2 is a diagram illustrating exemplary messages for performing an SRVCC handover according to an embodiment of the subject matter described herein.

FIG. 2 is a diagram illustrating exemplary messages for performing an SRVCC handover according to an embodiment of the subject matter described herein. In some embodiments, prior to a handover event, a call between VoIP SIP peer 108 and VoIP SIP peer 114 may be occurring in an 3GPP (e.g., LTE and LTE-advanced) network or involving 3GPP network nodes, e.g., MME 114 and SGW 118. In some embodiments, testing platform 100 may emulate one or more network nodes and/or may emulate or trigger mobility events by emulating or simulating movements of an emulated user device associated with VoIP SIP peer 108 or VoIP SIP peer 114. In response to mobility events that indicate a user device is outside an 3GPP coverage area, one or more messages may be exchanged to perform an SRVCC or I-RAT handover, such that the call between VoIP SIP peer 108 and VoIP SIP peer 114 continues using one or more different network nodes, e.g., SGSN 114.

In some embodiments, in order for a UE to be SRVCC-aware, MME and SGSN may internally notify VoIP SIP peer 108 when UE movement outside of the 3GPP coverage area starts and ends. This communication may be transparent to an end-user.

At step 1, a mobility event start message may be sent from MME 104 to VoIP SIP Peer 108. For example, a testing script or other mechanism may trigger a mobility event emulating a user device leaving a coverage area. In response, MME 104 may notify VoIP SIP peer 108 via internal communications channel 106.

In some embodiments, during a handover event, both VoIP SIP peer 108 and VoIP SIP peer 114 may concurrently stop transmitting VoIP packets (e.g., RTP traffic) so that no lost packets occur. In order to achieve this synchronization and to make it transparent to the end-user (e.g., no messages regarding this internal communication appearing on communications channel 120), peers may communicate via a communication channel 110.

At step 2, RTP transmission may be stopped at VoIP SIP peer 108. For example, in response to receiving a mobility start message from MME 104, VoIP SIP peer 108 may stop RTP transmission concurrently with (e.g., prior to or after)

sending a message for requesting that VoIP SIP peer 114 also stop RTP transmission. In this example, stopping RTP transmission may include stopping transmission of all packets associated with a call between VoIP SIP peer 108 to VoIP SIP peer 114. In some embodiments, RTP transmission may include transmission of any data packets, including packets of protocols other than RTP, associated with a call between VoIP SIP peer 108 to VoIP SIP peer 114.

At step 3, a stop RTP transmission request message may be sent from VoIP SIP peer 108 to VoIP SIP peer 114.

At step 4, RTP transmission may be stopped at VoIP SIP peer 114. For example, after receiving and processing a stop RTP transmission request message, VoIP SIP peer 114 may stop RTP transmission. After RTP transmission is stopped, a dedicated bearer (e.g., a bearer path) may be deleted or torn down to conserve network resources, such as resources at SGW 118.

At step 5, a delete bearer request may be sent from VoIP SIP peer 114 to SGW 118. In some embodiments, after receiving the delete bearer request from VoIP SIP peer 114, SGW 118 may initiate a bearer deletion procedure (e.g., a network-initiated delete dedicated bearer procedure) by sending a delete bearer request to MME 104.

At step 6, a delete bearer request message may be sent from SGW 118 to MME 104, thereby triggering or initiating a bearer deletion procedure. MME 104 may receive and process the delete bearer request. In response, MME 104 may delete the bearer path and send a response message back to SGW 118.

At step 7, a delete bearer response message may be sent from MME 104 to SGW 118, thereby indicating completion of a bearer deletion procedure.

In some embodiments, after completing a bearer deletion procedure, an I-RAT handover may occur. For example, an I-RAT handover may include establishing or modifying a bearer path for an existing call between VoIP SIP peer 108 and VoIP SIP peer 114. In this example, a bearer path for the call may include a network node associated with a 3G or IMS network, such as SGSN 104.

In some embodiments, deleting a dedicated bearer path may occur prior to an I-RAT handover and may be transparent (e.g., unseen) to an end-user, e.g., by using communications channel 110 to trigger the bearer deletion procedure.

In some embodiments, an I-RAT handover may involve various messages and multiple network nodes. For example, an MSC or SGSN 104 may be involved in an I-RAT handover. Examples of some messages associated with an I-RAT handover may include a session create request, a session create response, a create bearer request, a create bearer response, a modify bearer request, a modify bearer response, a delete bearer request, a delete bearer response, a delete session request, and a delete session response.

At step 8, a modify bearer request message may be sent from SGSN 104 to SGW 118. In some embodiments, the modify bearer request message may be part of an I-RAT handover procedure. SGW 118 may receive and process the modify bearer request. In response, SGW 118 may create or modify a bearer path and send a response message back to SGSN 104.

At step 9, a modify bearer response message may be sent from SGW 118 to SGSN 104. In some embodiment, a modify bearer response message may complete an I-RAT procedure and a bearer path may be established that involves one or more new or different network nodes (e.g., 3G nodes, universal terrestrial radio access network (UTRAN) nodes, Third Generation Partnership Project (3GPP) nodes, or IMS nodes).

At step 10, a mobility event stop message may be sent from SGSN 104 to VoIP SIP Peer 108. For example, after completing an I-RAT handover, SGSN 104 may notify SIP peer 108 that handover is complete via internal communications channel 106.

In some embodiments, during or after a handover event, both VoIP SIP peer 108 and VoIP SIP peer 114 may concurrently stop receiving VoIP packets (e.g., RTP traffic) so that no lost packets occur. In order to achieve this synchronization and to make it transparent to the end-user, peers may communicate via a communication channel 110.

At step 11, RTP reception may be stopped at VoIP SIP peer 108. For example, in response to receiving a mobility stop message from SGSN 104, VoIP SIP peer 108 may stop RTP reception concurrently with (e.g., prior to or after) sending a message for requesting that VoIP SIP peer 114 also stop RTP reception. In this example, stopping RTP reception may include stopping reception of all packets associated with a call between VoIP SIP peer 108 to VoIP SIP peer 114 associated with an old (e.g., deleted) bearer path or an inaccessible network node, e.g., a node no longer used by a current network. In some embodiments, RTP reception may include reception of any data packets, including packets of protocols other than RTP, associated with a call between VoIP SIP peer 108 to VoIP SIP peer 114.

At step 12, a stop RTP reception request message may be sent from VoIP SIP peer 108 to VoIP SIP peer 114.

At step 13, RTP reception may be stopped at VoIP SIP peer 114. For example, after receiving and processing a stop RTP transmission request message, VoIP SIP peer 114 may stop RTP reception associated with an old or deleted bearer path.

In some embodiments, as described herein, I-RAT handover (e.g., an open systems interconnection (OSI) layer 7 related procedure) and/or RTP transmission and RTP reception (e.g., OSI layer 3 related procedures) may be synchronized or triggered using communication channel 110 so that the SRVCC procedure is correctly performed.

In some embodiments, as discussed herein, similar operations and/or message flows are performed for stopping RTP transmission and/or RTP reception: By stopping RTP transmission and then RTP reception, it may be ensured that no RTP packets are lost when performing an SRVCC or I-RAT handover. For example, if VoIP SIP peer 108 stops both RTP transmission and RTP reception and afterwards notifies VoIP SIP peer 114, there may be a small delay before the notification arrives and is processed at VoIP SIP peer 114. During that delay, VoIP SIP peer 114 may still transmit RTP packets, which VoIP SIP peer 108 would not process because RTP reception is already stopped. Hence, in this example, lost packets might occur if both RTP transmission and reception simultaneously stop at VoIP SIP peer 108 prior to notifying VoIP SIP peer 114.

It will also be appreciated that the above described messages are for illustrative purposes and that different and/or additional messages may be used. For example, an I-RAT handover may include different signaling messages that shown, such as a session creation request message and a session creation response message.

Figure 3:
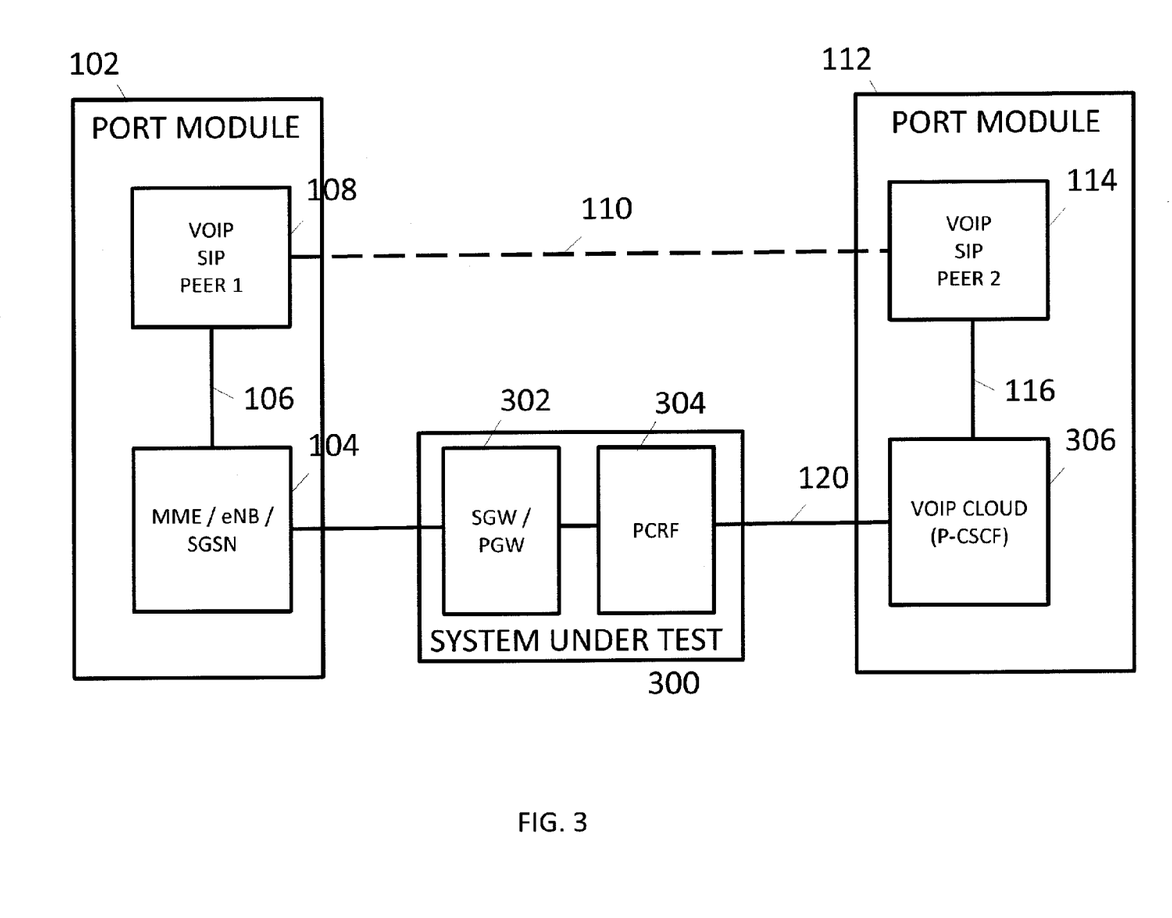
FIG. 3 is a diagram illustrating an exemplary testing platform for performing an SRVCC handover according to another embodiment of the subject matter described herein.

FIG. 3 is a diagram illustrating an exemplary testing platform 100 for performing an SRVCC handover according to another embodiment of the subject matter described herein. In some embodiments, testing platform 100 may be a stand-alone tool, a testing device, or software executing on a processor. In some embodiments, testing platform 100 may be a single node or may be distributed across multiple computing platforms or nodes.

In the embodiment illustrated in FIG. 3, testing platform 100 may be configured to perform one or more aspects associated with testing an SUT 300. SUT 300 may include various nodes, such as a serving gateway and/or a packet data network gateway (SGW/PGW) 302 and a policy and charging rules function (PCRF) 304. SUT 300 may perform various actions associated with SGW/PGW 302 and PCRF 304. For example, SGW/PGW 302 may facilitate establishing and destroying a tunnel for packets and PCRF 304 may provide policy rules and/or charging data for enforcement by SGW/PGW 302.

In some embodiments, tunnel encapsulated packets may be transmitted using a modulation and/or coding scheme, such as a modulation and/or coding scheme used in LTE or LTE advanced technology. In such embodiments, specialized radio equipment, known also as radio heads, may be used to transmit and receive the data.

In some embodiments, radio heads may be associated with one or more nodes in SUT 300 and/or testing platform 100 and may facilitate communications between SUT 300 and testing platform 100. In some embodiments, a radio head may be distinct from or integrated with SUT 300 and/or testing platform 100 or a module therein.

Port modules 102 and 112 may be configured to communicate with SUT 300 or nodes therein. For example, port modules 102 and 112 may include additional or different interfaces and/or one or more emulated nodes for communicating with SUT 300 or nodes therein. In some embodiments, MME/eNB/SGSN 104 may be configured to communicate with SGW/PGW 302 via an S4 interface or another interface. For example, SGSN 104 may be configured to use an S4 interface to provide control and mobility support between GPRS Core & 3GPP network nodes.

Port module 112 may include a VoIP cloud simulator 306. VoIP cloud simulator may include any suitable entity (e.g., software executing on a processor) for emulating or simulating one or more nodes in VoIP network. In some embodiments, VoIP cloud simulator 306 may perform functionality associated with a VoIP core network, such as a call session control function (CSCF) or a proxy CSCF. In some embodiments, VoIP cloud simulator 306 may act a SIP proxy for VoIP SIP peer 114. VoIP cloud simulator 306 may be part of a signaling path associated with SUT 300 and VoIP SIP peer 114 and may inspect packets or communications received from or sent to SUT 300. VoIP cloud simulator 306 may also provide security and media resource control functions associated with VoIP SIP peer 114.

Communications channel 110 may represent an inter-peer (e.g., intra- or inter-platform) channel between port module 102 and port module 112. Communications channel 110 may facilitate communications between VoIP SIP peer 108 and VOIP SIP peer 114. Communications exchanged using communications channel 110 may not traverse SUT 300 and may use a channel or interfaces internal to testing platform 100. In some embodiments, communications channel 110 may be transparent or invisible to one or more end-users or nodes, e.g., SUT 300 or a SUT operator. For example, a SUT operator may be unaware of messages traversing communications channel 110, but aware of messages traversing communications channel 120.

Communications channel 120 may represent communication channel between SUT 300 and port modules 102 and/or 112. Communications channel 120 may include an S4 interface or other interfaces between MME/eNB/SGSN 104 and SGW/PGW 302, one or more interfaces between PCRF 304 and VoIP cloud simulator 306, and/or one or more interfaces between SGW/PGW 302 and VoIP cloud simulator 306. For example, a call signaling control message (e.g., a create bearer path request or a create bearer path response) may be sent between MME/eNB/SGSN 104 and SGW/PGW 302 via communications channel 120. In another example, VoIP packets may be exchanged between VoIP SIP peer 108 and VoIP SIP peer 114 by traversing MME/eNB/SGSN 104, SGW/PGW 302, VoIP cloud simulator 306 using communications channel 120.

In some embodiments, communications channel 120 may be referred to as the wire and message exchanged via communications channel 120 may be visible to one or more end-users or external probes or network nodes. In some embodiments, communications channel 120 may be part of a call signaling path or a call bearer path between VoIP SIP peer 108 and VoIP SIP peer 114.

It will also be appreciated that the above described modules, components, and nodes are for illustrative purposes and that features or portions of features described herein may be performed by different and/or additional modules, components, or nodes. It will also be appreciated that some modules and/or components may be combined and/or integrated.

Figure 4:
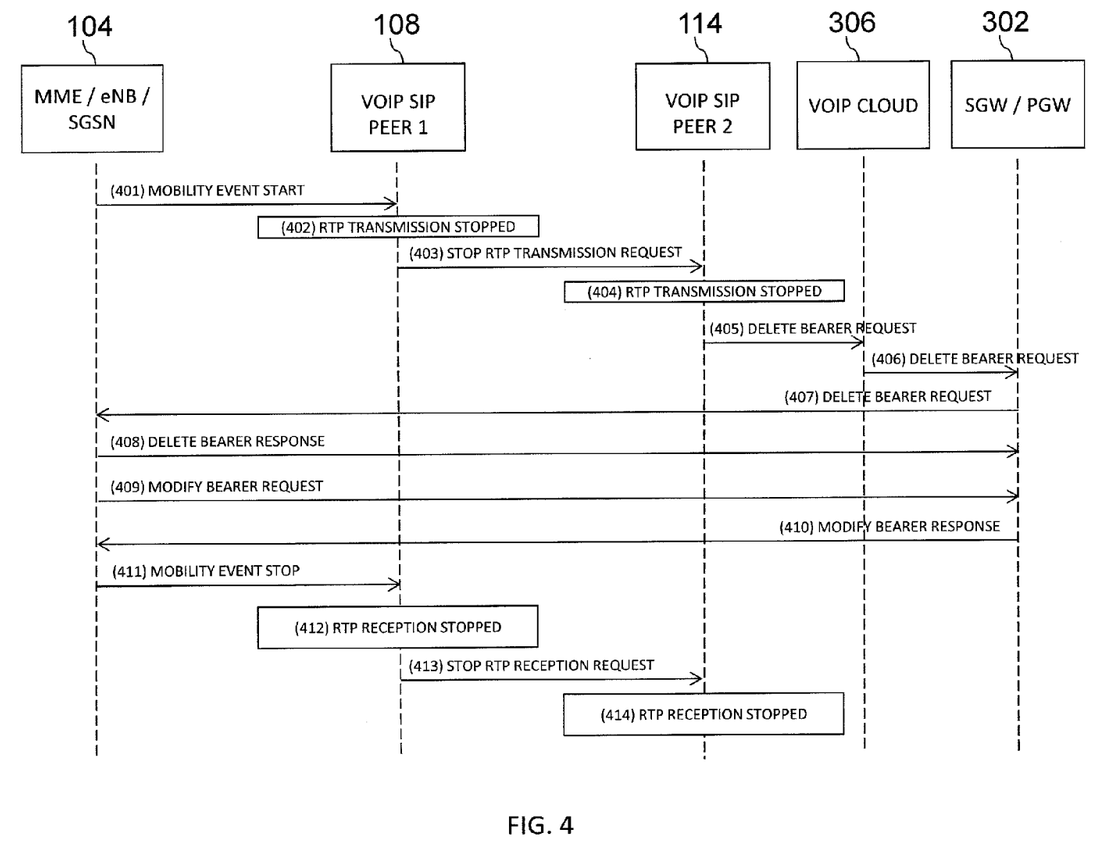
FIG. 4 is a diagram illustrating exemplary messages for performing an SRVCC handover according to another embodiment of the subject matter described herein.

FIG. 4 is a diagram illustrating exemplary messages for performing an SRVCC handover according to another embodiment of the subject matter described herein. In some embodiments, prior to a handover event, a call between VoIP SIP peer 108 and VoIP SIP peer 114 may be occurring in an 3GPP (e.g., LTE and LTE-advanced) network or involving 3GPP network nodes, e.g., MME 114 and SUT 300. In some embodiments, testing platform 100 may emulate one or more network nodes and/or may emulate or trigger mobility events by emulating or simulating movements of an emulated user device associated with VoIP SIP peer 108 or VoIP SIP peer 114. In response to mobility events that indicate a user device is outside an 3GPP coverage area, one or more messages may be exchanged to perform an SRVCC or I-RAT handover, such that the call between VoIP SIP peer 108 and VoIP SIP peer 114 continues using one or more different network nodes, e.g., SGSN 114.

In some embodiments, in order for a UE to be SRVCC-aware, MME and SGSN may internally notify VoIP SIP peer 108 when UE movement outside of the 3GPP coverage area starts and ends. This communication may be transparent to an end-user.

At step 401, a mobility event start message may be sent from MME 104 to VoIP SIP Peer 108. For example, a testing script or other mechanism may trigger a mobility event emulating a user device leaving a coverage area. In response, MME 104 may notify VoIP SIP peer 108 via internal communications channel 106.

In some embodiments, during a handover event, both VoIP SIP peer 108 and VoIP SIP peer 114 may concurrently stop transmitting VoIP packets (e.g., RTP traffic) so that no lost packets occur. In order to achieve this synchronization and to make it transparent to the end-user (e.g., no messages regarding this internal communication appearing on communications channel 120), peers may communicate via a communication channel 110.

At step 402, RTP transmission may be stopped at VoIP SIP peer 108. For example, in response to receiving a mobility start message from MME 104, VoIP SIP peer 108 may stop RTP transmission concurrently with (e.g., prior to or after) sending a message for requesting that VoIP SIP peer 114 also stop RTP transmission. In this example, stopping RTP transmission may include stopping transmission of all packets associated with a call between VoIP SIP peer 108 to VoIP SIP peer 114. In some embodiments, RTP transmission may include transmission of any data packets, including packets of protocols other than RTP, associated with a call between VoIP SIP peer 108 to VoIP SIP peer 114.

At step 403, a stop RTP transmission request message may be sent from VoIP SIP peer 108 to VoIP SIP peer 114.

At step 404, RTP transmission may be stopped at VoIP SIP peer 114. For example, after receiving and processing a stop RTP transmission request message, VoIP SIP peer 114 may stop RTP transmission. After RTP transmission is stopped, a dedicated bearer (e.g., a bearer path) may be deleted or torn down to conserve network resources, such as resources at SGW/PGW 302.

At step 405, a delete bearer request may be sent from VoIP SIP peer 114 to VoIP cloud simulator 306. In some embodiments, after receiving the delete bearer request from VoIP SIP peer 114, VoIP cloud simulator 306 may trigger a bearer deletion procedure (e.g., a delete dedicated bearer procedure) by sending a delete bearer request to MME 104 and/or by triggering SGW/PGW 302 to send a delete bearer request to MME 104.

At step 406, a delete bearer request may be sent from VoIP cloud simulator 306 to SGW/PGW 302. In some embodiments, after receiving the delete bearer request from VoIP cloud simulator 306, SGW/PGW 302 may initiate a bearer deletion procedure by sending a delete bearer request to MME 104.

At step 407, a delete bearer request message may be sent from SGW/PGW 302 to MME 104, thereby triggering or initiating a bearer deletion procedure. MME 104 may receive and process the delete bearer request. In response, MME 104 may delete the bearer path and send a response message back to SGW/PGW 302.

At step 408, a delete bearer response message may be sent from MME 104 to SGW/PGW 302, thereby indicating completion of a bearer deletion procedure.

In some embodiments, after completing a bearer deletion procedure, an I-RAT handover may occur. For example, an I-RAT handover may include establishing or modifying a bearer path for an existing call between VoIP SIP peer 108 and VoIP SIP peer 114. In this example, a bearer path for the call may include a network node associated with a 3G or IMS network, such as SGSN 104.

In some embodiments, deleting a dedicated bearer path may occur prior to an I-RAT handover and may be transparent (e.g., unseen) to an end-user, e.g., by using communications channel 110 to trigger the bearer deletion procedure.

In some embodiments, an I-RAT handover may involve various messages and multiple network nodes. For example, an MSC or SGSN 104 may be involved in an I-RAT handover.

At step 409, a modify bearer request message may be sent from SGSN 104 to SGW/PGW 302. In some embodiments, the modify bearer request message may be part of an I-RAT handover procedure. SGW/PGW 302 may receive and process the modify bearer request. In response, SGW/PGW 302 may create or modify a bearer path and send a response message back to SGSN 104.

At step 410, a modify bearer response message may be sent from SGW/PGW 302 to SGSN 104. In some embodiment, a modify bearer response message may complete an I-RAT procedure and a bearer path may be established that involves one or more new or different network nodes (e.g., 3G nodes, universal terrestrial radio access network (UTRAN) nodes, Third Generation Partnership Project (3GPP) nodes, or IMS nodes).

At step 411, a mobility event stop message may be sent from SGSN 104 to VoIP SIP Peer 108. For example, after completing an I-RAT handover, SGSN 104 may notify SIP peer 108 that handover is complete via internal communications channel 106.

In some embodiments, during or after a handover event, both VoIP SIP peer 108 and VoIP SIP peer 114 may concurrently stop receiving VoIP packets (e.g., RTP traffic) so that no lost packets occur. In order to achieve this synchronization and to make it transparent to the end-user, peers may communicate via communication channel 110.

At step 412, RTP reception may be stopped at VoIP SIP peer 108. For example, in response to receiving a mobility stop message from SGSN 104, VoIP SIP peer 108 may stop RTP reception concurrently with (e.g., prior to or after) sending a message for requesting that VoIP SIP peer 114 also stop RTP reception. In some embodiments, stopping RTP reception may be superfluous and/or optional since an associated bearer path is already deleted. For example, VoIP SIP peers 114 may be configured to discard any messages not associated with a valid bearer path.

At step 413, a stop RTP reception request message may be sent from VoIP SIP peer 108 to VoIP SIP peer 114.

At step 414, RTP reception may be stopped at VoIP SIP peer 114. For example, after receiving and processing a stop RTP transmission request message, VoIP SIP peer 114 may stop RTP reception associated with an old or deleted bearer path.

In some embodiments, as described herein, I-RAT handover (e.g., an open systems interconnection (OSI) layer 7 related procedure) and/or RTP transmission and RTP reception (e.g., OSI layer 3 related procedures) may be synchronized or triggered using communication channel 110 so that the SRVCC procedure is correctly performed.

In some embodiments, as discussed herein, similar operations and/or message flows are performed for stopping RTP transmission and/or RTP reception: By stopping RTP transmission and then RTP reception, it may be ensured that no RTP packets are lost when performing an SRVCC or I-RAT handover.

It will also be appreciated that the above described messages are for illustrative purposes and that different and/or additional messages may be used. For example, an I-RAT handover may include different signaling messages that shown, such as a session creation request message and a session creation response message.

Figure 5:
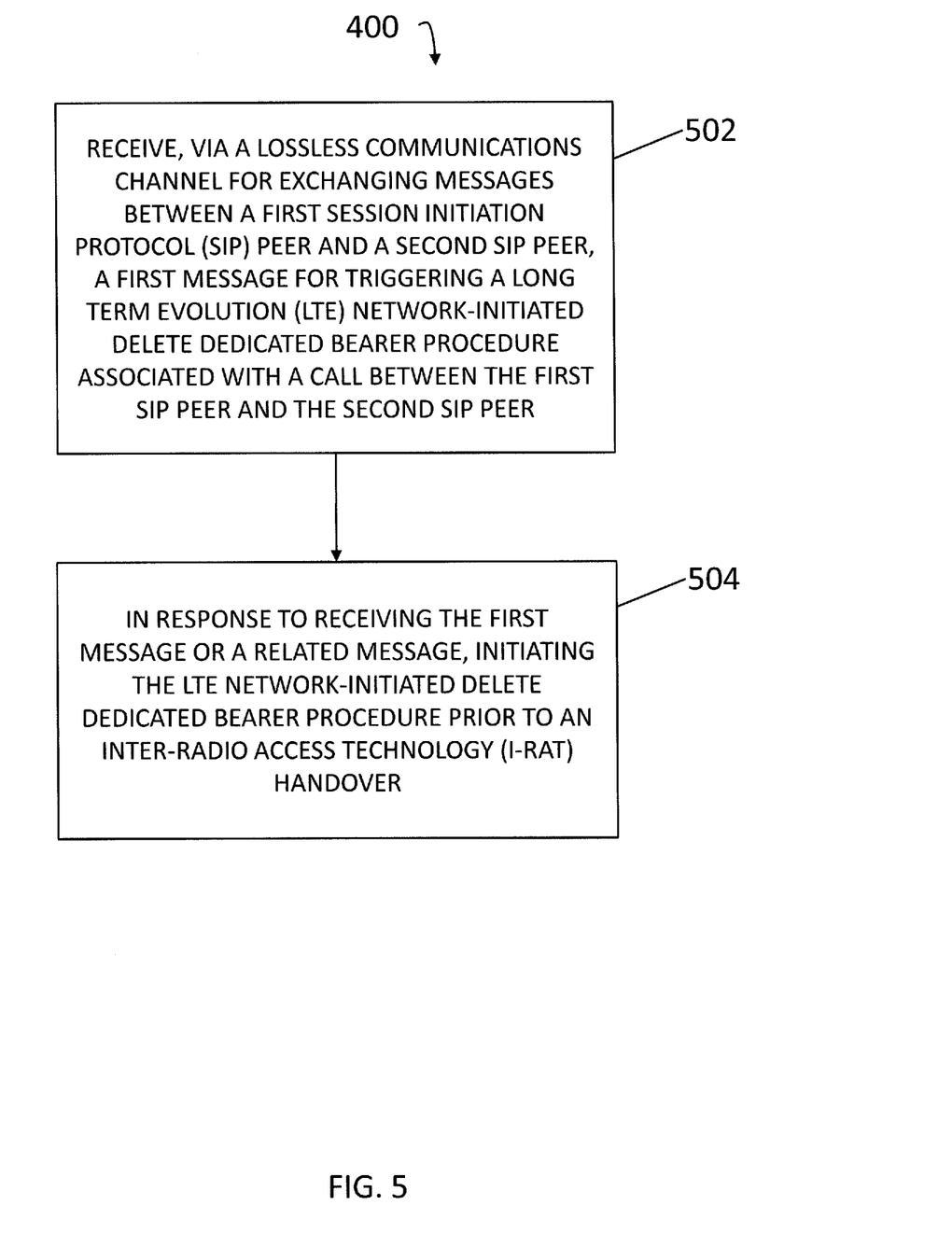
FIG. 5 is a diagram illustrating an exemplary process for performing an SRVCC handover according to an embodiment of the subject matter described herein.

FIG. 5 is a diagram illustrating an exemplary process for an SRVCC handover according to an embodiment of the subject matter described herein. In some embodiments, exemplary process 300, or portions thereof, may be performed by or at testing platform 100, port module 102, port module 112, SGW 118, MME/eNB/SGSN 104, VoIP SIP peer 108, VoIP SIP peer 114, and/or another node or module.

At step 502, a first message may be received via communications channel 110. The first message may be for triggering a bearer deletion procedure (e.g., a delete dedicated bearer procedure) associated with a call between VoIP SIP peer 108 and VoIP SIP peer 114.

In some embodiments, communications channel 110 may be associated with a communications interface, a loopback interface, an internal interface, a CPRI interface, a radio interface, a wired interface, a wireless interface, or a fiber interface.

In some embodiments, communications channel 110 may be different from a call bearer path between VoIP SIP peer 108 and VoIP SIP peer 114 and may be different from a call signaling path between VoIP SIP peer 108 and VoIP SIP peer 114.

In some embodiments, MME 104 may be emulated by testing platform 100 and the first message may be sent in response to MME/eNB/SGSN 104 notifying VoIP SIP peer 108 that an associated emulated user device is outside an 3GPP coverage area.

In some embodiments, MME/eNB/SGSN 104 may be emulated by testing platform 100, the first message may be sent from VoIP SIP peer 108 to VoIP SIP peer 114, and the first message may be received by VoIP SIP peer 114 prior to receiving, by VoIP SIP peer 114 and from MME/eNB/SGSN 104, a message indicating a handover event condition.

In some embodiments, SGW 118 or a network node (e.g., VoIP cloud simulator 306) may be emulated by testing platform 100, the first message may be sent from VoIP SIP peer 108 to VoIP SIP peer 114, a delete bearer request message may be sent by VoIP SIP peer 114 to SGW 118 or the network node in response to receiving the first message, and SGW 118 or the network node may trigger the bearer deletion procedure in response to receiving the delete bearer request message.

In some embodiments, an emulated network node may include a signaling gateway (SGW), a call session control function (CSCF), or a proxy CSCF.

At step 504, in response to receiving the first message or a related message, the bearer deletion procedure may be initiated or triggered prior to changing an access technology (e.g., from a 3GPP network node to a IMS network node). For example, a delete bearer request message may be sent from VoIP SIP peer 114 to SGW 118 in response to receiving, from VoIP SIP peer 108, a first message for triggering a bearer deletion procedure. In this example, SGW 118 may initiate the bearer deletion procedure in response to receiving the delete bearer request message.

In some embodiments, prior to deleting a bearer path (e.g., completing a bearer deletion procedure), RTP or VoIP related packets associated with the call may stop being transmitted at VoIP SIP peer 108 and at VoIP SIP peer 114 and after deleting the bearer path, RTP or VoIP related packets associated with the call may stop being received at VoIP SIP peer 108 and at VoIP SIP peer 114.

In some embodiments, changing the access technology includes performing I-RAT handover or establishing a call between VoIP SIP peer 108 and VoIP SIP peer 114 using a different network node than used prior to the I-RAT handover. For example, a different network node may include a node, a mobile switch center (MSC), a SGSN, an emulated node, an emulated MSC, or an emulated SGSN.

In some embodiments, VoIP SIP peer 108 may be associated with port module 102 in testing platform 100 and VoIP SIP peer 114 may be associated with port module 112 in testing platform 100.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for performing a single radio voice call continuity SRVCC) handover, the method comprising:
   at a testing platform:
      receiving, via a communications channel for ex hanging messages between a first session initiation protocol (SIP) peer and a second SIP peer, a first message for triggering a bearer deletion procedure associated with a call between the first SIP peer and the second SIP peer; and in response to receiving the first message or a related message, triggering the bearer deletion procedure prior to changing an access technology,
   wherein a serving gateway is emulated by the testing platform, wherein the first message is sent from the first SIP peer to the second SIP peer, wherein a delete bearer request message is sent from the second SIP peer to the serving gateway in response to receiving the first message, and wherein the serving gateway triggers the bearer deletion procedure in response to receiving the delete bearer request message, and
   wherein the first and second SIP peers use the communication channel to synchronize when the first and second SIP peers stop packet transmission and reception along a bearer path for the call in order to perform changing of the access technology without losing packets.

2. The method of claim 1 comprising:
   prior to deleting the bearer path, stopping transmission of real-time transport protocol (RTP) packets associated with the call at the first SIP peer and at the second SIP peer.

3. The method of claim 1 wherein changing the access technology includes performing an inter-radio access technology (I-RAT) handover or establishing the call between the first SIP peer and the second SIP peer using a different network node than used prior to changing the access technology.

4. The method of claim 3 wherein the different network node includes a node, a mobile switch center (MSC), a serving general packet radio service (GPRS) support node (SGSN), an emulated node, an emulated MSC, or an emulated SGSN.

5. The method of claim 1 wherein the communications channel is associated with a communications interface, a loopback interface, an internal interface, a CPRI interface, a radio interface, a wired interface, a wireless interface, or a fiber interface.

6. The method of claim 1 wherein the communications channel is different from the bearer path between the first SIP peer and the second SIP peer and is different from a call signaling path between the first SIP peer and the second SIP peer.

7. The method of claim 1 wherein the first SIP peer is associated with a first port module in the testing platform and wherein the second SIP peer is associated with a second port module in the testing platform.

8. The method of claim 1 wherein a mobility management entity (MME) is emulated by the testing platform, wherein the first message is sent from the first SIP peer to the second SIP peer, and wherein the first message is sent in response to the MME notifying the first SIP peer that an associated emulated user device is outside an 3GPP coverage area.

9. The method of claim 1 wherein a mobility management entity (MME) and a serving general packet radio service (GPRS) support node (SGSN) are emulated by the testing platform, wherein the first message is sent from the first SIP peer to the second SIP peer, and wherein the first message is received by the second SIP peer prior to receiving, by the second SIP Peer and from the SGSN or the MME, a message indicating a handover event condition.

10. The method of claim 1 wherein the serving gateway includes a signaling gateway (SGW), a call session control function (CSCF), or a proxy CSCF.

11. A system for performing a single radio voice call continuity (SRVCC) handover, the system comprising:

a testing platform comprising:
- a communications interface associated with a communications channel for exchanging messages between a first session initiation protocol (SIP) peer and a second SIP peer, the communications interface configured to receive a first message for triggering a bearer deletion procedure associated with a call between the first SIP peer and the second SIP peer; and
- a serving gateway emulated using at least one processor, wherein the serving gateway is configured to, in response to receiving the first message or a related message, trigger the bearer deletion procedure prior to changing an access technology,
- wherein the first message is sent from the first SIP peer to the second SIP peer, wherein a delete bearer request message is sent from the second SIP peer to the serving gateway in response to receiving the first message, and wherein the serving gateway initiates the bearer deletion procedure in response to receiving the delete bearer request message, and
- wherein the first and second SIP peers use the communication channel to synchronize when the first and second SIP peers stop packet transmission and reception along a bearer path for the call in order to perform changing of the access technology without losing packets.

12. The system of claim 11 wherein the testing platform is configured to stop transmission of real-time transport protocol (RTP) packets associated with the call at the first SIP peer.

13. The system of claim 11 wherein changing the access technology includes performing an inter-radio access technology (I-RAT) handover or establishing the call between the first SIP peer and the second SIP peer using a different network node than used prior to changing the access technology.

14. The system of claim 13 wherein the different network node includes a node, a mobile switch center (MSC), a serving general packet radio service (GPRS) support node (SGSN), an emulated node, an emulated MSC, or an emulated SGSN.

15. The system of claim 11 wherein the communications channel is associated with a communications interface, a loopback interface, an internal interface, a CPRI interface, a radio interface, a wired interface, a wireless interface, or a fiber interface.

16. The system of claim 11 wherein the communications channel is different from the bearer path between the first SIP peer and the second SIP peer and is different from a call signaling path between the first SIP peer and the second SIP peer.

17. The system of claim 11 wherein the first SIP peer is associated with a first port module in the testing platform and wherein the second SIP peer is associated with a second port module in the testing platform.

18. The system of claim 11 wherein a mobility management entity (MME) is emulated by the testing platform, wherein the first message is sent from the first SIP peer to the second SIP peer, and wherein the first message is sent in response to the MME notifying the first SIP peer that an associated emulated user device is outside an 3GPP coverage area.

19. The system of claim 11 wherein a mobility management entity (MME) and a serving general packet radio service (GPRS) support node (SGSN) are emulated by the testing platform, wherein the first message is sent from the first SIP peer to the second SIP peer, and wherein the first message is received by the second SIP peer prior to receiving, by the second SIP Peer and from the SGSN or the MME, a message indicating a handover event condition.

20. The system of claim 11 wherein the serving gateway includes a signaling gateway (SGW), a call session control function (CSCF), or a proxy CSCF.

21. A non-transitory computer readable medium comprising computer executable instructions that when executed by a processor of a computer control the computer to perform steps comprising:
- at a testing platform:
  - receiving, via a communications channel for exchanging messages between a first SIP peer and a second session initiation protocol (SIP) peer, a first message for triggering a bearer deletion procedure associated with a call between the first SIP peer and the second SIP peer; and
  - in response to receiving the first message or a related message, triggering the bearer deletion procedure prior to changing an access technology,
  - wherein a serving gateway is emulated by the testing platform, wherein the first message is sent from the first SIP peer to the second SIP peer, wherein a delete bearer request message is sent from the second SIP peer to the serving gateway in response to receiving the first message, and wherein the serving gateway triggers the bearer deletion procedure in response to receiving the delete bearer request message, and
  - wherein the first and second SIP peers use the communication channel to synchronize when the first and second SIP peers stop packet transmission and reception along a bearer path for the call in order to perform changing of the access technology without losing packets.

* * * * *